US009850738B2

(12) United States Patent
Frazier

(10) Patent No.: US 9,850,738 B2
(45) Date of Patent: *Dec. 26, 2017

(54) BOTTOM SET DOWNHOLE PLUG

(71) Applicant: Magnum Oil Tools International, Ltd., Corpus Christi, TX (US)

(72) Inventor: W. Lynn Frazier, Corpus Christi, TX (US)

(73) Assignee: Magnum Oil Tools International, Ltd., Corpus Christi, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/834,550

(22) Filed: Aug. 25, 2015

(65) Prior Publication Data

US 2015/0361756 A1    Dec. 17, 2015

Related U.S. Application Data

(60) Continuation of application No. 13/329,096, filed on Dec. 16, 2011, which is a division of application No. (Continued)

(51) Int. Cl.
*E21B 33/134* (2006.01)
*E21B 23/06* (2006.01)
(Continued)

(52) U.S. Cl.
CPC .......... *E21B 33/134* (2013.01); *B23P 19/047* (2013.01); *E21B 23/06* (2013.01);
(Continued)

(58) Field of Classification Search
CPC .................................................... E21B 33/134
See application file for complete search history.

(56) References Cited

U.S. PATENT DOCUMENTS 2,230,447 A * 2/1941 Bassinger ............. E21B 33/134
                                                        166/124
3,082,824 A * 3/1963 Taylor ................. E21B 33/1293
                                                        166/123
(Continued)

OTHER PUBLICATIONS

In Re: Magnum Oil Tools International, Ltd., Appellant, US Court of Appeals for the Federal Circuit, 2015-1300, Appeal from the United States Patent and Trademark Office, Patent Trial and Appeal Board, in No. IPR2013-00231, Opinion/Judgment Decided: Jul. 25, 2016, 29 pages.

*Primary Examiner* — Robert E Fuller
(74) *Attorney, Agent, or Firm* — Jackson Walker, LLP

(57) ABSTRACT

A plug for isolating a wellbore. The plug can include a body having a first end and a second end, wherein the body is formed from one or more composite materials and adapted to receive a setting tool through the first end thereof, at least one malleable element disposed about the body, at least one slip disposed about the body, at least one conical member disposed about the body, and one or more shearable threads disposed on an inner surface of the body, adjacent the second end thereof, wherein the one or more shearable threads are adapted to receive at least a portion of a setting tool that enters the body through the first end thereof, and wherein the one or more shearable threads are adapted to engage the setting tool when disposed through the body and adapted to release the setting tool when exposed to a predetermined axial force.

36 Claims, 7 Drawing Sheets

Related U.S. Application Data

13/194,871, filed on Jul. 29, 2011, now Pat. No. 8,079,413, which is a continuation-in-part of application No. 12/317,497, filed on Dec. 23, 2008, now Pat. No. 8,496,052.

(51) Int. Cl.

| | | |
|---|---|---|
| *E21B 33/12* | (2006.01) | |
| *B23P 19/04* | (2006.01) | |
| *E21B 34/00* | (2006.01) | |
| *E21B 33/129* | (2006.01) | |
| *B23P 19/08* | (2006.01) | |
| *B25B 27/00* | (2006.01) | |

(52) U.S. Cl.
CPC .......... *E21B 33/12* (2013.01); *E21B 33/1204* (2013.01); *B23P 19/084* (2013.01); *B25B 27/0028* (2013.01); *E21B 33/1294* (2013.01); *E21B 2034/005* (2013.01); *Y10T 29/49872* (2015.01)

(56) References Cited

U.S. PATENT DOCUMENTS

| | | | |
|---|---|---|---|
| 3,094,166 A * | 6/1963 | McCullough | ......... E21B 23/065 166/123 |
| 4,437,516 A | 3/1984 | Cockrell | |
| 4,595,052 A | 6/1986 | Kristiansen | |
| 5,224,540 A * | 7/1993 | Streich | ................... E21B 29/00 166/118 |
| 7,350,582 B2 * | 4/2008 | McKeachnie et al. | ....... 166/373 |
| 2007/0151722 A1 | 7/2007 | Lehr | |

\* cited by examiner

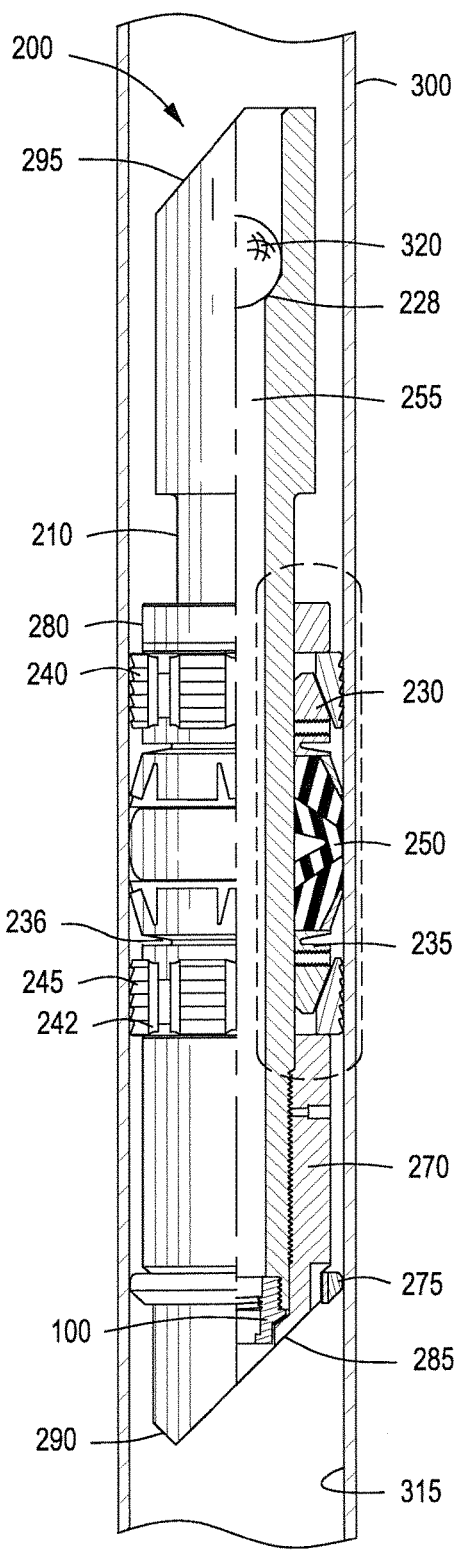
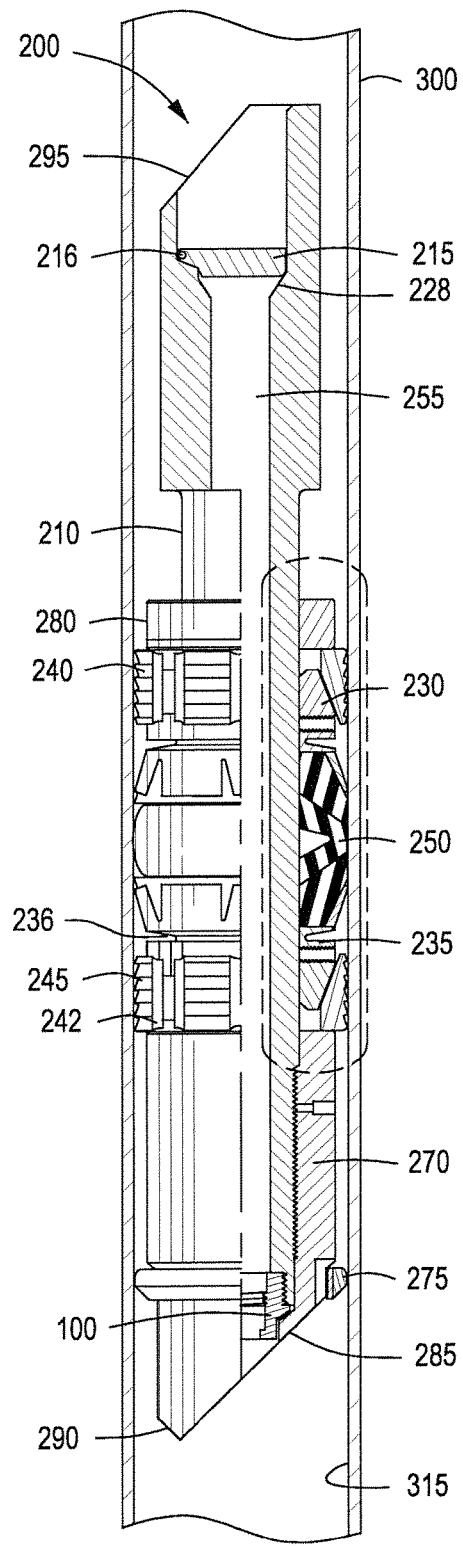
FIG. 3C
FIG. 3D

BOTTOM SET DOWNHOLE PLUG

CROSS-REFERENCE TO RELATED APPLICATIONS

This is a continuation application of U.S. application Ser. No. 13/329,096, filed Dec. 16, 2011, which is a divisional of U.S. patent application Ser. No. 13/194,871, filed Jul. 29, 2011, which is a continuation-in-part of U.S. patent application Ser. No. 12/317,497, filed Dec. 23, 2008, the entirety of which is incorporated by reference herein.

BACKGROUND

Field

Embodiments described generally relate to downhole tools. More particularly, embodiments described relate to downhole tools that are set within a wellbore with a lower shear mechanism.

Description of the Related Art

Bridge plugs, packers, and frac plugs are downhole tools that are typically used to permanently or temporarily isolate one wellbore zone from another. Such isolation is often necessary to pressure test, perforate, frac, or stimulate a zone of the wellbore without impacting or communicating with other zones within the wellbore. To reopen and/or restore fluid communication through the wellbore, plugs are typically removed or otherwise compromised.

Permanent, non-retrievable plugs and/or packers are typically drilled or milled to remove. Most non-retrievable plugs are constructed of a brittle material such as cast iron, cast aluminum, ceramics, or engineered composite materials, which can be drilled or milled. Problems sometimes occur, however, during the removal or drilling of such non-retrievable plugs. For instance, the non-retrievable plug components can bind upon the drill bit, and rotate within the casing string. Such binding can result in extremely long drill-out times, excessive casing wear, or both. Long drill-out times are highly undesirable, as rig time is typically charged by the hour.

In use, non-retrievable plugs are designed to perform a particular function. A bridge plug, for example, is typically used to seal a wellbore such that fluid is prevented from flowing from one side of the bridge plug to the other. On the other hand, drop ball plugs allow for the temporary cessation of fluid flow in one direction, typically in the downhole direction, while allowing fluid flow in the other direction. Depending on user preference, one plug type may be advantageous over another, depending on the completion and/or production activity.

Certain completion and/or production activities may require several plugs run in series or several different plug types run in series. For example, one well may require three bridge plugs and five drop ball plugs, and another well may require two bridge plugs and ten drop ball plugs for similar completion and/or production activities. Within a given completion and/or production activity, the well may require several hundred plugs and/or packers depending on the productivity, depths, and geophysics of each well. The uncertainty in the types and numbers of plugs that might be required typically leads to the over-purchase and/or under-purchase of the appropriate types and numbers of plugs resulting in fiscal inefficiencies and/or field delays.

There is a need, therefore, for a downhole tool that can effectively seal the wellbore at wellbore conditions; be quickly, easily, and/or reliably removed from the wellbore; and configured in the field to perform one or more functions.

BRIEF DESCRIPTION OF THE DRAWINGS

Non-limiting, illustrative embodiments are depicted in the drawings, which are briefly described below. It is to be noted, however, that these illustrative drawings illustrate only typical embodiments and are not to be considered limiting of its scope, for the invention can admit to other equally effective embodiments.

FIG. 3C depicts a partial section view of the plug of FIG. 2A located in an expanded or actuated position within the casing, according to one or more embodiments described.

FIG. 3D depicts a partial section view of the plug of FIG. 2B located in an expanded or actuated position within the casing, according to one or more embodiments described.

DETAILED DESCRIPTION

A plug for isolating a wellbore is provided. The plug can include one or more lower shear or shearable mechanisms for connecting to a setting tool. The lower shear or shearable mechanism can be located directly on the body of the plug or on a separate component or insert that is placed within the body of the plug. The lower shear or shearable mechanism is adapted to engage a setting tool and release the setting tool when exposed to a predetermined stress that is sufficient to deform the shearable threads to release the setting tool but is less than a stress sufficient to break the plug body. The term "stress" and "force" are used interchangeably, and are intended to refer to a system of forces that may in include axial force, radial force, and/or a combination thereof. The terms "shear mechanism" and "shearable mechanism" are used interchangeably, and are intended to refer to any component, part, element, member, or thing that shears or is capable of shearing at a predetermined stress that is less than the stress required to shear the body of the plug. The term "shear" means to fracture, break, or otherwise deform thereby releasing two or more engaged components, parts, or things or thereby partially or fully separating a single component into two or more components/pieces. The term "plug" refers to any tool used to permanently or temporarily isolate one wellbore zone from another, including any tool with blind passages, plugged mandrels, as well as open passages extending completely therethrough and passages that are blocked with a check valve. Such tools are commonly referred to in the art as "bridge plugs," "frac plugs," and/or "packers." And such tools can be a single assembly (i.e. one plug) or two or more assemblies (i.e. two or more plugs) disposed within a work string or otherwise connected thereto that is run into a wellbore on a wireline, slickline, production tubing, coiled tubing or any technique known or yet to be discovered in the art.

Figure 1A:
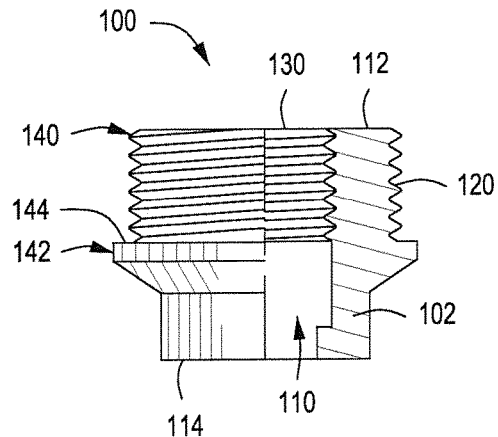
FIG. 1A depicts a partial section view of an illustrative insert for use with a plug for downhole use, according to one or more embodiments described.

FIG. 1A depicts a partial section view of an illustrative, shearable insert 100 for a plug, according to one or more embodiments. The insert 100 can include a body 102 having a first or upper end 112 and a second or lower end 114. A passageway or bore 110 can be completely or at least partially formed through the body 102. One or more threads 120 can be disposed or formed on an outer surface of the body 102. The threads 120 can be disposed on the outer surface of the body 102 toward the upper end 112. As discussed in more detail below with reference to FIGS. 2A-2C and FIGS. 3A-D, the threads 120 can be used to secure the insert 100 within a surrounding component, such as another insert 100, setting tool, tubing string, plug, or other tool.

Figure 1B:
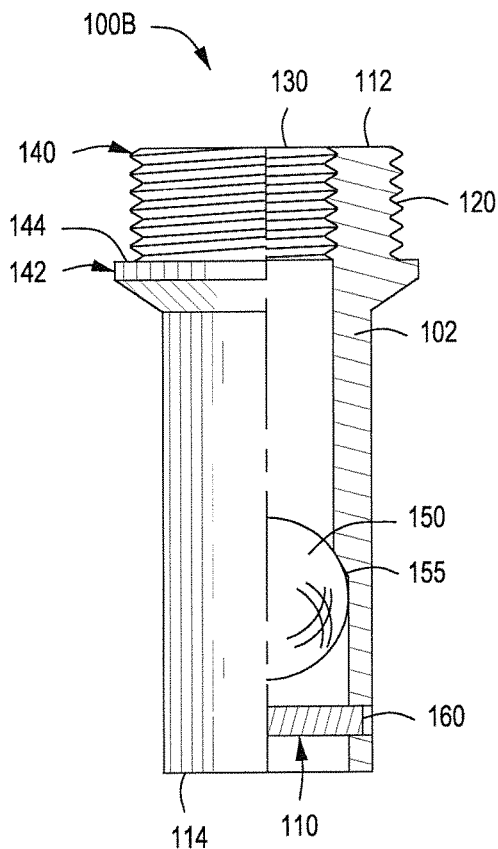
FIG. 1B depicts a partial section view of another illustrative embodiment of the insert for use with a plug for downhole use, according to one or more embodiments described.

FIG. 1B depicts a partial section view of an alternative embodiment of the illustrative, shearable insert 100B for a plug. The insert 100B can include any combination of features of insert 100, and additionally, a ball 150 or other solid impediment can seat against either or both ends of the bore 110 to regulate or check fluid flow therethrough. As depicted in FIG. 1B, the body 102 can include a shoulder 155 formed in, coupled to, or otherwise provided, which can be sized to receive the ball 150 and to seal therewith. Accordingly, the ball 150 can seat against the shoulder 155 to restrict fluid flow through the bore 110 from below the insert 100B. An adapter pin 160 can be inserted through the body 102 to cage the ball 150 or other solid impediment in the bore 110, between the pin 160 and the shoulder 155.

One or more shearable threads 130 can be disposed or formed on an inner surface of the body 102. The shearable threads 130 can be used to couple the insert 100, 100B to another insert 100, 100B, setting tool, tubing string, plug, or other tool. The shearable threads 130 can be located anywhere along the inner surface of the body 102, and are not dependent on the location of the outer threads 120. For example, the location of the shearable threads 130 can be located beneath or above the outer threads 120; toward the first end 112 of the insert 100, 100B, as depicted in FIGS. 1 and 1B; and/or toward the second end 114 of the insert 100, 100B.

Any number of shearable threads 130 can be used. The number, pitch, pitch angle, and/or depth of the shearable threads 130 can depend, at least in part, on the operating conditions of the wellbore where the insert 100, 100B will be used. The number, pitch, pitch angle, and/or depth of the shearable threads 130 can also depend, at least in part, on the materials of construction of both the insert 100, 100B and the component, e.g., another insert 100, 100B, a setting tool, another tool, plug, tubing string, etc., to which the insert 100, 100B is connected. The number of threads 130, for example, can range from about 2 to about 100, such as about 2 to about 50; about 3 to about 25; or about 4 to about 10. The number of threads 130 can also range from a low of about 2, 4, or 6 to a high of about 7, 12, or 20. The pitch between each thread 130 can also vary depending on the force required to shear, break, or otherwise deform the threads 130. The pitch between each thread 130 can be the same or different. For example, the pitch between each thread 130 can vary from about 0.1 mm to about 200 mm; 0.2 mm to about 150 mm; 0.3 mm to about 100 mm; or about 0.1 mm to about 50 mm. The pitch between each thread 130 can also range from a low of about 0.1 mm, 0.2 mm, or 0.3 mm to a high of about 2 mm, 5 mm or 10 mm.

The shearable threads 130 can be adapted to shear, break, or otherwise deform when exposed to a predetermined stress or force, releasing the component engaged within the body 102. The predetermined stress or force can be less than a stress and/or force required to fracture or break the body 102 of the insert 100, 100B. Upon the threads 130 shearing, breaking, or deforming, the component engaged within the body 102 can be freely removed or separated therefrom.

Any number of outer threads 120 can be used. The number of outer threads 120, for example, can range from about 2 to about 100, such as about 2 to about 50; about 3 to about 25; or about 4 to about 10. The number of threads 120 can also range from a low of about 2, 4, or 6 to a high of about 7, 12, or 20. The pitch between each thread 120 can also vary. The pitch between each thread 120 can be the same or different. For example, the pitch between each thread 120 can vary from about 0.1 mm to about 200 mm; 0.2 mm to about 150 mm; 0.3 mm to about 100 mm; or about 0.1 mm to about 50 mm. The pitch between each thread 120 can also range from a low of about 0.1 mm, 0.2 mm, or 0.3 mm to a high of about 2 mm, 5 mm or 10 mm.

The threads 120 and the shearable threads 130 can be right-handed and/or left-handed threads. For example, to facilitate connection of the insert 100, 100B to a setting tool when the setting tool is coupled to, for example, screwed into the insert 100, 100B, the threads 120 can be right-handed threads and the shearable threads 130 can be left-handed threads, or vice versa.

The outer surface of the insert 100, 100B can have a constant diameter, or its diameter can vary, as depicted in FIGS. 1A and 1B. For example, the outer surface can include a smaller first diameter portion or area 140 that transitions to a larger, second diameter portion or area 142, forming a ledge or shoulder 144 therebetween. The shoulder 144 can have a first end that is substantially flat, abutting the second diameter 142, a second end that gradually slopes or transitions to the first diameter 140, and can be adapted to anchor the insert into the plug. The shoulder 144 can be formed adjacent the outer threads 120 or spaced apart therefrom, and the outer threads 120 can be above or below the shoulder 144.

The insert 100, 100B and/or the shearable threads 130 can be made of an alloy that includes brass. Suitable brass compositions include, but are not limited to, admiralty brass, Aich's alloy, alpha brass, alpha-beta brass, aluminum brass, arsenical brass, beta brass, cartridge brass, common brass, dezincification resistant brass, gilding metal, high brass, leaded brass, lead-free brass, low brass, manganese brass, Muntz metal, nickel brass, naval brass, Nordic gold, red brass, rich low brass, tonval brass, white brass, yellow brass, and/or any combinations thereof.

The insert 100, 100B can also be formed or made from other metallic materials (such as aluminum, steel, stainless steel, copper, nickel, cast iron, galvanized or non-galvanized metals, etc.), fiberglass, wood, composite materials (such as ceramics, wood/polymer blends, cloth/polymer blends, etc.), and plastics (such as polyethylene, polypropylene, polystyrene, polyurethane, polyethylethylketone (PEEK), polytetrafluoroethylene (PTFE), polyamide resins (such as nylon 6 (N6), nylon 66 (N66)), polyester resins (such as polybutylene terephthalate (PBT), polyethylene terephthalate (PET), polyethylene isophthalate (PEI), PET/PEI copolymer) polynitrile resins (such as polyacrylonitrile (PAN), polymethacrylonitrile, aerylonitrile-styrene copolymers (AS), methacrylonitrile-styrene copolymers, methacrylonitrile-styrene-butadiene copolymers; and acrylonitrile-butadiene-styrene (ABS)), polymethacrylate resins (such as polymethyl methacrylate and polyethylacrylate), cellulose resins (such as cellulose acetate and cellulose acetate butyrate); polyimide resins (such as aromatic polyimides), polycarbonates (PC), elastomers (such as ethylene-propylene rubber (EPR), ethylene propylene-diene monomer rubber (EPDM), styrenic block copolymers (SBC), polyisobutylene (PIB), butyl rubber, neoprene rubber, halobutyl rubber and the like)), as well as mixtures, blends, and copolymers of any and all of the foregoing materials.

Figure 2A:
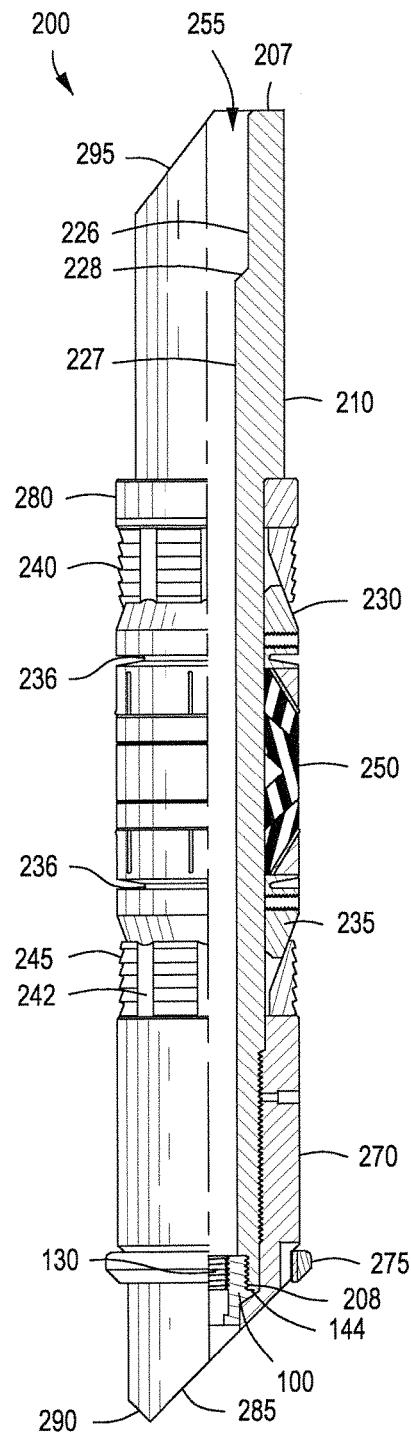
FIG. 2A depicts a partial section view of an illustrative plug configured with the insert of FIG. 1, according to one or more embodiments described.

FIG. 2A depicts a partial section view of an illustrative plug 200 configured with the insert 100, 100B and adapted to receive a ball type impediment or another type of impediment, according to one or more embodiments. The plug 200 can include a mandrel or body 210 having a first or upper end 207 and a second or lower end 208. A passageway or bore 255 can be formed at least partially through the body 210. The body 210 can be a single, monolithic component as shown, or the body 210 can be or include two or more components connected, engaged, or otherwise attached together. The body 210 serves as a centralized support member, made of one or more components or parts, for one or more outer components to be disposed thereon or thereabout.

The insert 100, 100B can be threaded or otherwise disposed within the plug 200 at a lower end 208 of the body 210. A setting tool, tubing string, plug, or other tool can enter the bore 255 through the first end 207 of the body 210 and can be threaded to or otherwise coupled to and/or disposed within the insert 100. As further described herein, the shearable threads 130 on the insert 100 can be sheared, fractured, or otherwise deformed, releasing the setting tool, tubing string, plug, or other tool from the plug 200.

The bore 255 can have a constant diameter throughout, or its diameter can vary, as depicted in FIG. 2A. For example, the bore 255 can include a larger, first diameter portion or area 226 that transitions to a smaller, second diameter portion or area 227, forming a seat or shoulder 228 therebetween. The shoulder 228 can have a tapered or sloped surface connecting the two diameter portions or areas 226, 227. Although not shown, the shoulder 228 can be flat or substantially flat, providing a horizontal or substantially horizontal surface connecting the two diameters 226, 227. As will be explained in more detail below, the shoulder 228 can serve as a seat or receiving surface for plugging off the bore 255 when a ball (shown in FIG. 3C) or other impediment, such as a flapper member 215 (shown in FIG. 3D), is placed within the bore 255.

At least one conical member (two are shown: 230, 235), at least one slip (two are shown: 240, 245), and at least one malleable element 250 can be disposed about the body 210. As used herein, the term "disposed about" means surrounding the component, e.g., the body 210, allowing for relative movement therebetween (e.g., by sliding, rotating, pivoting, or a combination thereof). A first section or second end of the conical members 230, 235 has a sloped surface adapted to rest underneath a complementary sloped inner surface of the slips 240, 245. As explained in more detail below, the slips 240, 245 travel about the surface of the adjacent conical members 230, 235, thereby expanding radially outward from the body 210 to engage an inner surface of a surrounding tubular or borehole. A second section or second end of the conical members 230, 235 can include two or more tapered pedals or wedges adapted to rest about an adjacent malleable element 250. One or more circumferential voids 236 can be disposed within or between the first and second sections of the conical members 230, 235 to facilitate expansion of the wedges about the malleable element 250. The wedges are adapted to hinge or pivot radially outward and/or hinge or pivot circumferentially. The groove or void 236 can facilitate such movement. The wedges pivot, rotate, or otherwise extend radially outward, and can contact an inner diameter of the surrounding tubular or borehole. Additional details of the conical members 230, 235 are described in U.S. Pat. No. 7,762,323.

The inner surface of each slip 240, 245 can conform to the first end of the adjacent conical member 230, 235. An outer surface of the slips 240, 245 can include at least one outwardly-extending serration or edged tooth to engage an inner surface of a surrounding tubular, as the slips 240, 245 move radially outward from the body 210 due to the axial movement across the adjacent conical members 230, 235.

The slips 240, 245 can be designed to fracture with radial stress. The slips 240, 245 can include at least one recessed groove 242 milled or otherwise formed therein to fracture under stress allowing the slips 240, 245 to expand outward and engage an inner surface of the surrounding tubular or borehole. For example, the slips 240, 245 can include two or more, for example, four, sloped segments separated by equally-spaced recessed grooves 242 to contact the surrounding tubular or borehole.

The malleable element 250 can be disposed between the conical members 230, 235. A three element 250 system is depicted in FIG. 2A, but any number of elements 250 can be used. The malleable element 250 can be constructed of any one or more malleable materials capable of expanding and sealing an annulus within the wellbore. The malleable element 250 is preferably constructed of one or more synthetic materials capable of withstanding high temperatures and pressures, including temperatures up to 450° F., and pressure differentials up to 15,000 psi. Illustrative materials include elastomers, rubbers, TEFLON®, blends and combinations thereof.

The malleable element(s) 250 can have any number of configurations to effectively seal the annulus defined between the body 210 and the wellbore. For example, the malleable element(s) 250 can include one or more grooves, ridges, indentations, or protrusions designed to allow the malleable element(s) 250 to conform to variations in the shape of the interior of the surrounding tubular or borehole.

At least one component, ring, or other annular member 280 for receiving an axial load from a setting tool can be disposed about the body 210 adjacent a first end of the slip 240. The annular member 280 for receiving the axial load can have first and second ends that are substantially flat. The first end can serve as a shoulder adapted to abut a setting tool (not shown). The second end can abut the slip 240 and transmit axial forces therethrough.

Each end of the plug 200 can be the same or different. Each end of the plug 200 can include one or more anti-rotation features 270, disposed thereon. Each anti-rotation feature 270 can be screwed onto, formed thereon, or otherwise connected to or positioned about the body 210 so that there is no relative motion between the anti-rotation feature 270 and the body 210. Alternatively, each anti-rotation feature 270 can be screwed onto or otherwise connected to or positioned about a shoe, nose, cap, or other separate component, which can be made of composite, that is screwed onto threads, or otherwise connected to or positioned about the body 210 so that there is no relative motion between the anti-rotation feature 270 and the body 210. The anti-rotation feature 270 can have various shapes and forms. For example, the anti-rotation feature 270 can be or can resemble a mule shoe shape (not shown), half-mule shoe shape (illustrated in FIG. 5), flat protrusions or flats (illustrated in FIGS. 7 and 8), clutches (illustrated in FIG. 6), or otherwise angled surfaces 285, 290, 295 (illustrated in FIGS. 2A, 2B, 2C, 3A, 3B, 3C, 3D and 5).

As explained in more detail below, the anti-rotation features 270 are intended to engage, connect, or otherwise contact an adjacent plug, whether above or below the adjacent plug, to prevent or otherwise retard rotation therebetween, facilitating faster drill-out or mill times. For example, the angled surfaces 285, 290 at the bottom of a first plug 200 can engage the sloped surface 295 at the top of a second plug 200 in series, so that relative rotation therebetween is prevented or greatly reduced.

A pump down collar 275 can be located about a lower end of the plug 200 to facilitate delivery of the plug 200 into the wellbore. The pump down collar 275 can be a rubber O-ring or similar sealing member to create an impediment in the wellbore during installation, so that a push surface or resistance can be created.

Figure 2B:
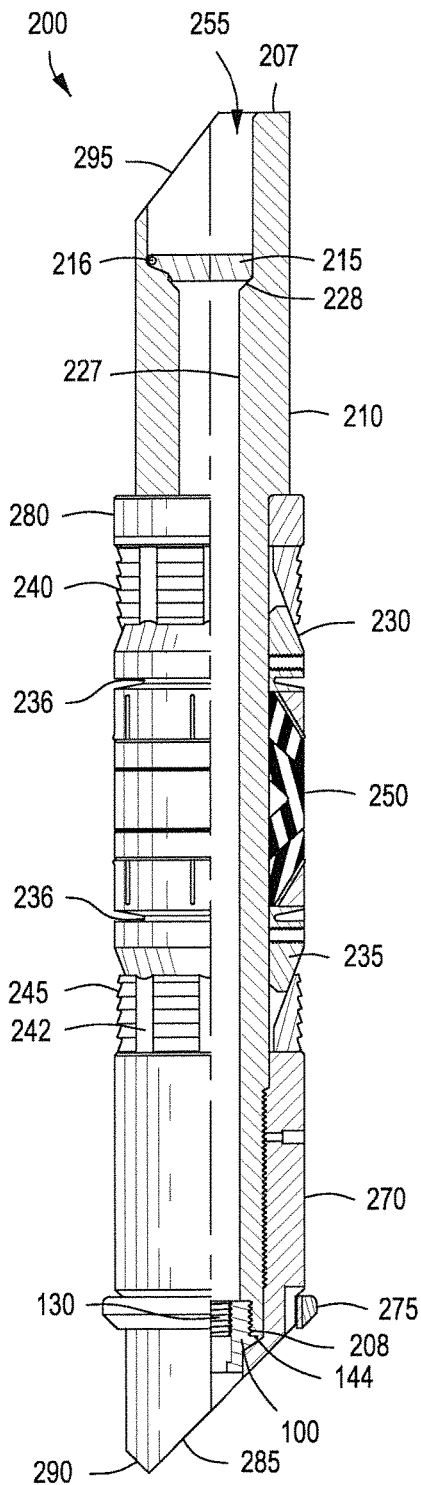
FIG. 2B depicts a partial section view of the illustrative plug configured with the insert of FIG. 1 and a flapper valve, according to one or more embodiments described.

FIG. 2B depicts a partial section view of the illustrative plug 200 configured with a flapper-type impediment for regulating flow through the bore 255, according to one or more embodiments. The flapper-type impediment can include a flapper member 215 connected to the body 210 using one or more pivot pins 216. The flapper member 215 can be flat or substantially flat. Alternatively, the flapper member 215 can have an arcuate shape, with a convex upper surface and a concave lower surface. A spring (not shown) can be disposed about the one or more pivot pins 216 to urge the flapper member 215 from a run-in ("first" or "open") position wherein the flapper member 215 does not obstruct the bore 255 through the plug 200, to an operating ("second" or "closed") position, as depicted in FIG. 2B, where the flapper member 215 assumes a position proximate to the shoulder or valve seat 228, transverse to the bore 255 of the plug 200. At least a portion of the spring can be disposed upon or across the upper surface of the flapper member 215 providing greater contact between the spring and the flapper member 215, offering greater leverage for the spring to displace the flapper member 215 from the run-in position to the operating position. In the run-in position, bi-directional, e.g., upward and downward or side to side, fluid communication through the plug 200 can occur. In the operating position, unidirectional, e.g., upward. as shown.

As used herein the term "arcuate" refers to any body, member, or thing having a cross-section resembling an arc. For example, a flat, elliptical member with both ends along the major axis turned downwards by a generally equivalent amount can form an arcuate member. The terms "up" and "down"; "upward" and "downward"; "upper" and "lower"; "upwardly" and "downwardly"; "upstream" and "downstream"; "above" and "below"; and other like terms as used herein refer to relative positions to one another and are not intended to denote a particular spatial orientation since the tool and methods of using same can be equally effective in either horizontal or vertical wellbore uses. Additional details of a suitable flapper assembly can be found in U.S. Pat. No. 7,708,066, which is incorporated by reference herein in its entirety.

Figure 2C:
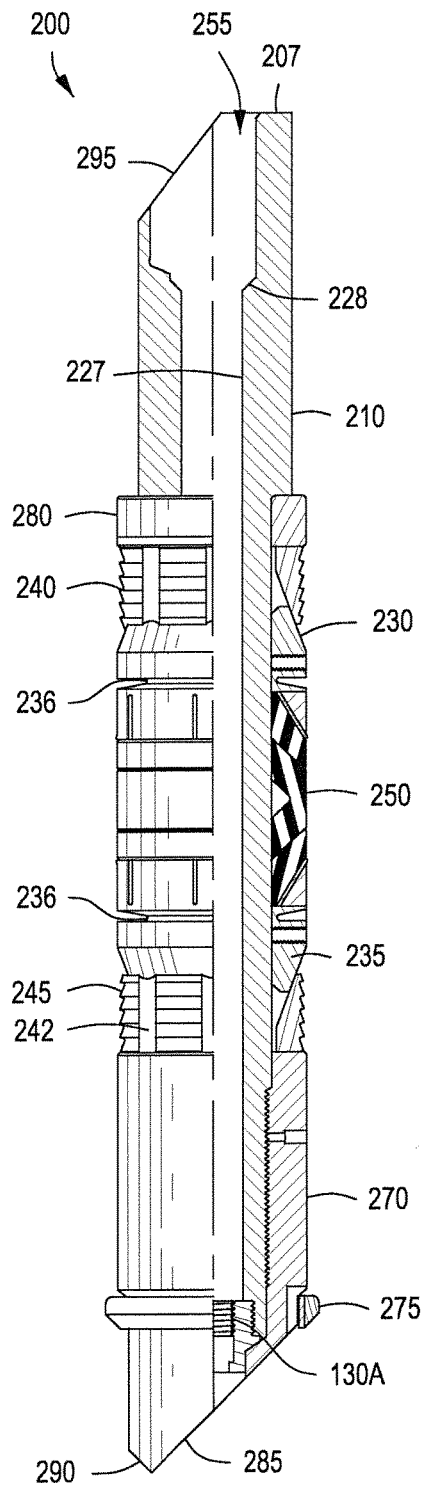
FIG. 2C depicts a partial section view of another illustrative plug with a lower shear mechanism disposed directly on the plug body, according to one or more embodiments.

FIG. 2C depicts a partial section view of another illustrative plug 200 with a lower shear mechanism disposed directly on the plug body, according to one or more embodiments. This is an alternative configuration where one or more shearable threads 130A are formed directly on the inner surface of the bore 255. No insert 100, 100B is needed. The shearable threads 130A can be made of the same composite material as the body 210 of the plug 200, or can be made from a different material.

Any number of shearable threads 130A can be used. The number of shearable threads 130A can depend, at least in part, on the operating conditions and/or environment of the wellbore where the plug 200 will be used. The number of threads 130A, for example, can range from about 2 to about 100, such as about 2 to about 50; about 3 to about 25; or about 4 to about 10. The number of threads 130A can also range from a low of about 2, 4, or 6 to a high of about 7, 12, or 20.

The pitch of the threads BOA can also vary depending on the force required to shear, break, or otherwise deform the threads BOA. The pitch of the threads BOA can be the same or different. For example, the spacing between each thread 130A can vary from about 0.1 mm to about 200 mm; 0.2 mm to about 150 mm; 0.3 mm to about 100 mm; or about 0.1 mm to about 50 mm. The spacing between each thread 120 can also range from a low of about 0.1 mm, 0.2 mm, or 0.3 mm to a high of about 2 mm, 5 mm or 10 mm.

The shearable threads BOA can be adapted to shear, break, or otherwise deform when exposed to a predetermined stress or force, releasing the component engaged within the body 210. The predetermined stress or force is preferably less than a stress or force required to fracture, break, or otherwise significantly deform the body 210. Upon the threads 130A shearing, breaking, or deforming, the component engaged within the plug 200 can be freely removed or separated therefrom. The component engaged within the plug 200 via the shearable threads 130A or insert 100 will typically be a rod or extender from a setting tool used to install the plug 200 within a wellbore.

Figure 3A:
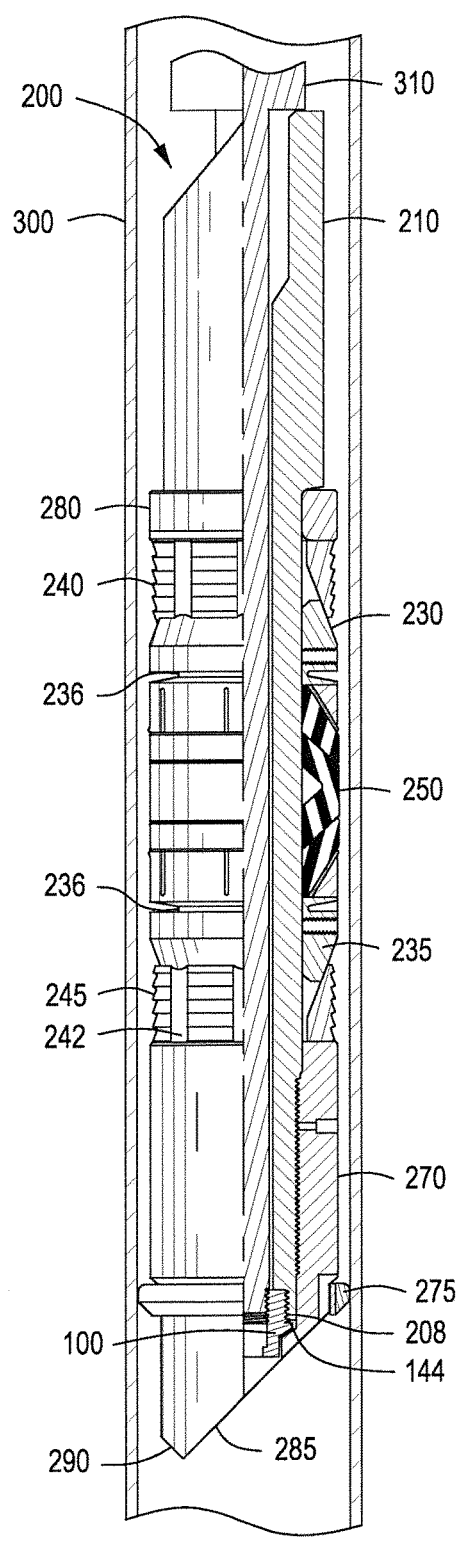
FIG. 3A depicts a partial section view of the plug of FIG. 2A located within a casing prior to installation, according to one or more embodiments described.
Figure 3B:
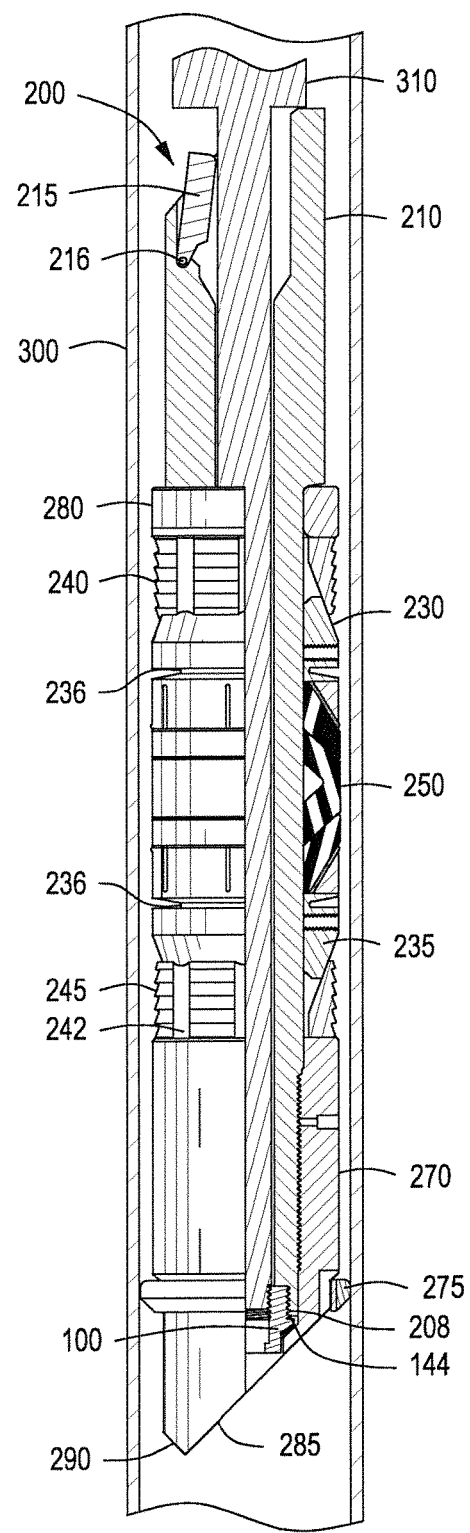
FIG. 3B depicts a partial section view of the plug of FIG. 2B located within the casing prior to installation, according to one or more embodiments described.

FIG. 3A depicts a partial section view of the plug 200 depicted in FIG. 2A, prior to installation or actuation but after being disposed within casing 300, according to one or more embodiments. FIG. 3B depicts a partial section view of the plug 200 depicted in FIG. 2B, prior to installation or actuation but after being disposed within casing 300, according to one or more embodiments.

The plug 200 can be installed in a vertical, horizontal, or deviated wellbore using any suitable setting tool adapted to engage the plug 200. One example of such a suitable setting tool or assembly includes a gas operated outer cylinder powered by combustion products and an adapter rod. The outer cylinder of the setting tool abuts an outer, upper end of the plug 200, such as against the annular member 280. The outer cylinder can also abut directly against the upper slip 240, for example, in embodiments of the plug 200 where the annular member 280 is omitted, or where the outer cylinder fits over or otherwise avoids bearing on the annular member 280. The adapter rod 310 is threadably connected to the body 210 and/or the insert 100. Suitable setting assemblies that are commercially-available include the Owen Oil Tools wireline pressure setting assembly or a Model 10, 20 E-4, or E-5 Setting Tool available from Baker Oil Tools, for example.

Figure 4:
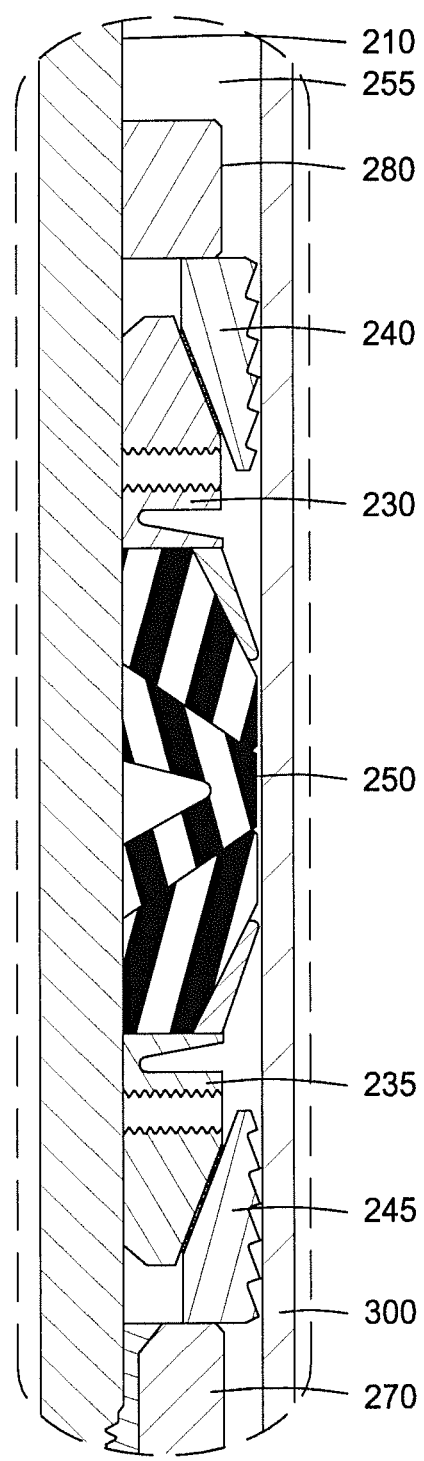
FIG. 4 depicts a partial section view of the expanded plug depicted in FIGS. 3C and 3D, according to one or more embodiments described.

During the setting process, the outer cylinder (not shown) of the setting tool exerts an axial force against the outer, upper end of the plug 200 in a downward direction that is matched by the adapter rod 310 of the setting tool exerting an equal and opposite force from the lower end of the plug 200 in an upward direction. For example, in the embodiment illustrated in FIGS. 3A and 3B, the outer cylinder of the setting assembly exerts an axial force on the annular member 280, which translates the force to the slips 240, 245 and the malleable elements 250 that are disposed about the body 210 of the plug 200. The translated force fractures the recessed groove(s) 242 of the slips 240, 245, allowing the slips 240, 245 to expand outward and engage the inner surface of the casing or wellbore 300, while at the same time compresses the malleable elements 250 to create a seal between the plug 200 and the inner surface of the casing or wellbore 300, as shown in FIG. 4. FIG. 4 depicts an illustrative partial section view of the expanded or actuated plug 200, according to one or more embodiments described.

After actuation or installation of the plug 200, the setting tool can be released from the shearable threads 130, BOA of the plug 200, or the insert 100 that is screwed into the plug 200 by continuing to apply the opposing, axial forces on the body 210 via the adapter rod 310 and the outer cylinder. The opposing, axial forces applied by the outer cylinder and the adapter rod 310 result in a compressive load on the body 210, which is borne as internal stress once the plug 200 is actuated and secured within the casing or wellbore 300. The force or stress is focused on the shearable threads 130, 130A, which will eventually shear, break, or otherwise deform at a predetermined amount, releasing the adapter rod 310 therefrom. The predetermined axial force sufficient to deform the shearable threads 130 and/or 130A to release the setting tool is less than an axial force sufficient to break the plug body 210.

Using a lower set mechanism, be it the insert 100 or shearable threads 130A directly on the body 210, allows the plug 200 to be squeezed from opposing ends. This provides a more balanced and efficient translation of force to the moveable components about the body 210, and reduces the stress directly applied to the body 210 itself. As such, the body 210 and a majority of the outer components of the plug 200 can be made of a softer, drillable material, such as a composite material, since the stress being asserted thereon during the setting process is reduced. Conventional cast iron and other metallic plugs are set from the upper end of the plug, which translates all of the force needed to squeeze and actuate the plug on the plug body itself. As such, the plug body had to be constructed of a more rigid material capable of withstanding such stress and torque. The lower set mechanism described herein, however, alleviates the torque and stress on the plug body 210, allowing the plug body 210 to be made of lighter, more easily drillable, non-metallic materials.

Once actuated and released from the setting tool, the plug 200 is left in the wellbore to serve its purpose, as depicted in FIGS. 3C and 3D. For example, a ball 320 can be dropped in the wellbore to constrain, restrict, and/or prevent fluid communication in a first direction through the body 210. For example, the dropped ball 320 can rest on the transition or ball seat 228 to form an essentially fluid-tight seal therebetween, as depicted in FIG. 3C, preventing downward fluid flow through the plug 200 ("the first direction") while allowing upward fluid flow through the plug 200 ("the second direction"). Alternatively, the flapper member 215 can rotate toward the closed position to constrain, restrict, and/or prevent downward fluid flow through the plug 200 ("the first direction") while allowing upward fluid flow through the plug 200 ("the second direction"), as depicted in FIG. 3D.

The ball 150, 320 or the flapper member 215 can be fabricated from one or more decomposable materials. Suitable decomposable materials will decompose, degrade, degenerate, or otherwise fall apart at certain wellbore conditions or environments, such as predetermined temperature, pressure, pH, and/or any combinations thereof. As such, fluid communication through the plug 200 can be prevented for a predetermined period of time, e.g., until and/or if the decomposable material(s) degrade sufficiently allowing fluid flow therethrough. The predetermined period of time can be sufficient to pressure test one or more hydrocarbon-bearing zones within the wellbore. In one or more embodiments, the predetermined period of time can be sufficient to workover the associated well. The predetermined period of time can range from minutes to days. For example, the degradable rate of the material can range from about 5 minutes, 40 minutes, or 4 hours to about 12 hours, 24 hours or 48 hours. Extended periods of time are also contemplated.

The pressures at which the ball 150, 320 or the flapper member 215 decompose can range from about 100 psig to about 15,000 psig. For example, the pressure can range from a low of about 100 psig, 1,000 psig, or 5,000 psig to a high about 7,500 psig, 10,000 psig, or about 15,000 psig. The temperatures at which the ball 320 or the flapper member 215 decompose can range from about 100° F. to about 750° F. For example, the temperature can range from a low of about 100° F., 150° F., or 200° F. to a high of about 350° F., 500° F., or 750° F.

The decomposable material can be soluble in any material, such as soluble in water, polar solvents, non-polar solvents, acids, bases, mixtures thereof, or any combination thereof. The solvents can be time-dependent solvents. A time-dependent solvent can be selected based on its rate of degradation. For example, suitable solvents can include one or more solvents capable of degrading the soluble components in about 30 minutes, 1 hour, or 4 hours to about 12 hours, 24 hours, or 48 hours. Extended periods of time are also contemplated.

The pHs at which the ball 150, 320 or the flapper member 215 can decompose can range from about 1 to about 14. For example, the pH can range from a low of about 1, 3, or 5 to a high about 9, 11, or about 14.

To remove the plug 200 from the wellbore, the plug 200 can be drilled-out, milled, or otherwise compromised. As it is common to have two or more plugs 200 located in a single wellbore to isolate multiple zones therein, during removal of one or more plugs 200 from the well bore some remaining portion of a first, upper plug 200 can release from the wall of the wellbore at some point during the drill-out. Thus, when the remaining portion of the first, upper plug 200 falls and engages an upper end of a second, lower plug 200, the anti-rotation features 270 of the remaining portions of the plugs 200 will engage and prevent, or at least substantially reduce, relative rotation therebetween.

Figure 6:
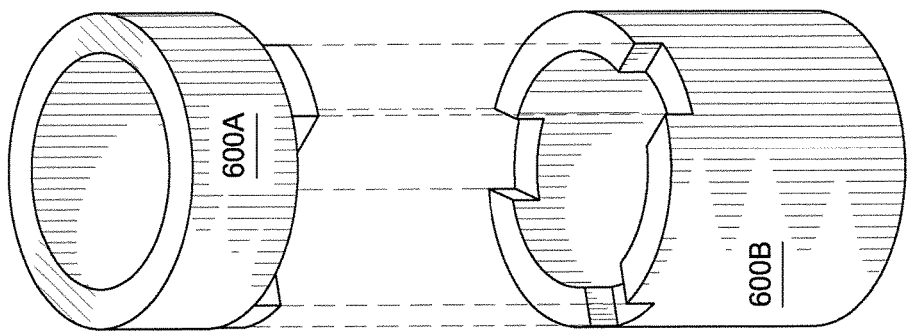
FIG. 6 depicts an illustrative, dog clutch anti-rotation feature, allowing a first plug and a second plug to interact and/or engage in series according to one or more embodiments described.
Figure 5:
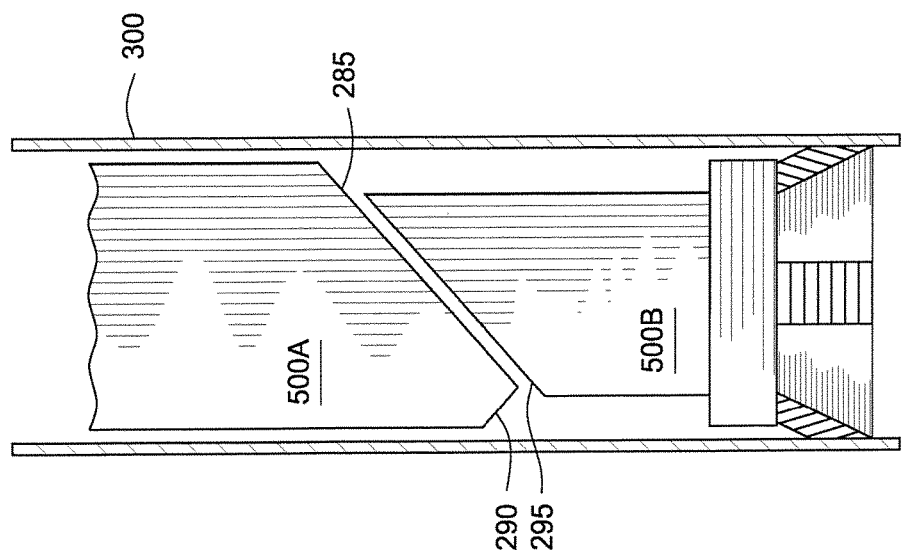
FIG. 5 depicts an illustrative, complementary set of angled surfaces that function as anti-rotation features to interact and/or engage between a first plug and a second plug in series, according to one or more embodiments described.
Figure 8:
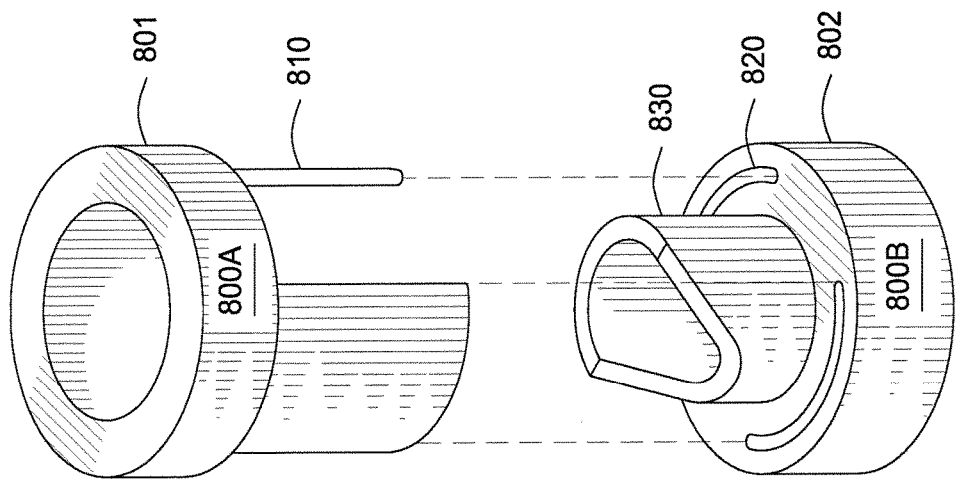
FIG. 8 depicts another illustrative, complementary set of flats and slots that serve as anti-rotation features to interact and/or engage between a first plug and a second plug in series, according to one or more embodiments described.
Figure 7:
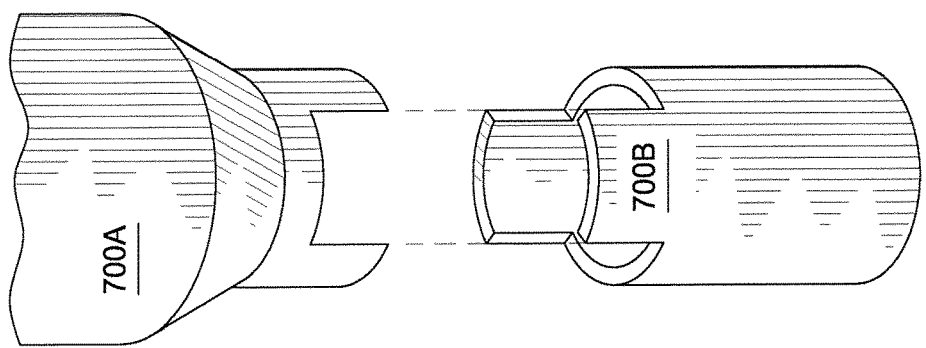
FIG. 7 depicts an illustrative, complementary set of flats and slots that serve as anti-rotation features to interact and/or engage between a first plug and a second plug in series, according to one or more embodiments described.

FIGS. 5-8 depict schematic views of illustrative anti-rotation features that can be used with the plugs 200 to prevent or reduce rotation during drill-out. These features are not intended to be exhaustive, but merely illustrative, as there are many other configurations that are effective to accomplish the same results. Each end of the plug 200 can be the same or different. For example, FIG. 5 depicts angled surfaces or half-mule anti-rotation features; FIG. 6 depicts dog clutch type anti-rotation features; and FIGS. 7 and 8 depict two flat and slot type anti-rotation features.

Referring to FIG. 5, a lower end of an upper plug 500A and an upper end of a lower plug 500B are shown within the casing 300 where the angled surfaces 285, 290 interact with, interface with, interconnect, interlock, link with, join, jam with or within, wedge between, or otherwise communicate with a complementary angled surface 295 and/or at least a surface of the wellbore or casing 300. The interaction between the lower end of the upper plug 500A and the upper end of the lower plug 500B and/or the casing 300 can counteract a torque placed on the lower end of the upper plug 500A, and prevent or greatly reduce rotation therebetween. For example, the lower end of the upper plug 500A can be prevented from rotating within the wellbore or casing 300 by the interaction with upper end of the lower plug 500B, which is held securely within the casing 300.

Referring to FIG. 6, dog clutch surfaces of the upper plug 600A can interact with, interface with, interconnect, interlock, link with, join, jam with or within, wedge between, or otherwise communicate with a complementary dog clutch surface of the lower plug 600B and/or at least a surface of the wellbore or casing 300. The interaction between the lower end of the upper plug 600A and the upper end of the lower plug 600B and/or the casing 300 can counteract a torque placed on the lower end of the upper plug 600A, and prevent or greatly reduce rotation therebetween. For example, the lower end of the upper plug 600A can be prevented from rotating within the wellbore or casing 300 by the interaction with upper end of the lower plug 600B, which is held securely within the casing 300.

Referring to FIG. 7, the flats and slot surfaces of the upper plug 700A can interact with, interface with, interconnect, interlock, link with, join, jam with or within, wedge between, or otherwise communicate with complementary flats and slot surfaces of the lower plug 700B and/or at least a surface of the wellbore or casing 300. The interaction between the lower end of the upper plug 700A and the upper end of the lower plug 700B and/or the casing 300 can counteract a torque placed on the lower end of the upper plug 700A, and prevent or greatly reduce rotation therebetween. For example, the lower end of the upper plug 700A can be prevented from rotating within the wellbore or casing 300 by the interaction with upper end of the lower plug 700B, which is held securely within the casing 300. The protruding perpendicular surfaces of the lower end of the upper plug 700A can mate in the perpendicular voids of the upper end of the lower plug 700B. When the lower end of the upper plug 700A and the upper end of the lower plug 700B are mated, any further rotational force applied to the lower end of the upper plug 700A will be resisted by the engagement of the lower plug 700B with the wellbore or casing 300, translated through the mated surfaces of the anti-rotation feature 270, allowing the lower end of the upper plug 700A to be more easily drilled-out of the wellbore.

One alternative configuration of flats and slot surfaces is depicted in FIG. 8. The protruding cylindrical or semi-cylindrical surfaces 810 perpendicular to the base 801 of the lower end of the upper plug 800A mate with the complementary aperture(s) 820 in the complementary base 802 of the upper end of the lower plug 800B. Protruding surfaces 810 can have any geometry perpendicular to the base 801, as long as the complementary aperture(s) 820 match the geometry of the protruding surfaces 801 so that the surfaces 801 can be threaded into the aperture(s) 820 with sufficient material remaining in the complementary base 802 to resist rotational force that can be applied to the lower end of the upper plug 800A, and thus translated to the complementary base 802 by means of the protruding surfaces 801 being inserted into the aperture(s) 820 of the complementary base 802. The anti-rotation feature 270 may have one or more protrusions or apertures 830, as depicted in FIG. 8, to guide, interact with, interface with, interconnect, interlock, link with, join, jam with or within, wedge between, or otherwise communicate or transmit force between the lower end of the upper plug 800A and the upper end of the lower plug 800B. The protrusion or aperture 830 can be of any geometry practical to further the purpose of transmitting force through the anti-rotation feature 270.

The orientation of the components of the anti-rotation features 270 depicted in all figures is arbitrary. Because plugs 200 can be installed in horizontal, vertical, and deviated wellbores, either end of the plug 200 can have any anti-rotation feature 270 geometry, wherein a single plug 200 can have one end of a first geometry and one end of a second geometry. For example, the anti-rotation feature 270 depicted in FIG. 5 can include an alternative embodiment where the lower end of the upper plug 500A is manufactured with geometry resembling 500B and vice versa. Each end of each plug 200 can be or include angled surfaces, half-mule, mule shape, dog clutch, flat and slot, cleated, slotted, spiked, and/or other interdigitating designs. In the alternative to a plug with complementary anti-rotation feature 270 geometry on each end of the plug 200, a single plug 200 can include two ends of differently-shaped anti-rotation features, such as the upper end may include a half-mule anti-rotation feature 270, and the lower end of the same plug 200 may include a dog clutch type anti-rotation feature 270. Further, two plugs 200 in series may each comprise only one type of anti-rotation feature 270 each, however the interface between the two plugs 200 may result in two different anti-rotation feature 270 geometries that can interface with, interconnect, interlock, link with, join, jam with or within, wedge between, or otherwise communicate or transmit force between the lower end of the upper plug 200 with the first geometry and the upper end of the lower plug 200 with the second geometry.

Any of the aforementioned components of the plug 200, including the body, rings, cones, elements, shoe, anti-rotation features, etc., can be formed or made from any one or more non-metallic materials or one or more metallic materials (such as aluminum, steel, stainless steel, brass, copper, nickel, cast iron, galvanized or non-galvanized metals, etc.). Suitable non-metallic materials include, but are not limited to, fiberglass, wood, composite materials (such as ceramics, wood/polymer blends, cloth/polymer blends, etc.), and plastics (such as polyethylene, polypropylene, polystyrene, polyurethane, polyethylethylketone (PEEK), polytetrafluoroethylene (PTFE), polyamide resins (such as nylon 6 (N6), nylon 66 (N66)), polyester resins (such as polybutylene terephthalate (PBT), polyethylene terephthalate (PET), polyethylene isophthalate (PEI), PET/PET copolymer) polynitrile resins (such as polyacrylonitrile (PAN), polymethacrylonitrile, acrylonitrile-styrene copolymers (AS), methacrylonitrile-styrene copolymers, methacrylonitrile-styrene-butadiene copolymers; and acrylonitrile-butadiene-styrene (ABS)), polymethacrylate resins (such as polymethyl methacrylate and polyethylacrylate), cellulose resins (such as cellulose acetate and cellulose acetate butyrate); polyimide resins (such as aromatic polyimides), polycarbonates (PC), elastomers (such as ethylene-propylene rubber (EPR), ethylene propylene-diene monomer rubber (EPDM), styrenic block copolymers (SBC), polyisobutylene (PIB), butyl rubber, neoprene rubber, halobutyl rubber and the like)), as well as mixtures, blends, and copolymers of any and all of the foregoing materials.

However, as many components as possible are made from one or more non-metallic materials, and preferably made from one or more composite materials. Desirable composite materials can be or include polymeric composite materials that are wound and/or reinforced by one or more fibers such as glass, carbon, or aramid, for example. The individual fibers can be layered parallel to each other, and wound layer upon layer. Each individual layer can be wound at an angle of from about 20 degrees to about 160 degrees with respect to a common longitudinal axis, to provide additional strength and stiffness to the composite material in high temperature and/or pressure downhole conditions. The particular winding phase can depend, at least in part, on the required strength and/or rigidity of the overall composite material.

The polymeric component of the composite can be an epoxy blend. The polymer component can also be or include polyurethanes and/or phenolics, for example. In one aspect, the polymeric composite can be a blend of two or more epoxy resins. For example, the polymeric composite can be a blend of a first epoxy resin of bisphenol A and epichlorohydrin and a second cycoaliphatic epoxy resin. Preferably, the cycloaphatic epoxy resin is ARALDITE® RTM liquid epoxy resin, commercially available from Ciga-Geigy Corporation of Brewster, N.Y. A 50:50 blend by weight of the two resins has been found to provide the suitable stability and strength for use in high temperature and/or pressure applications. The 50:50 epoxy blend can also provide suitable resistance in both high and low pH environments.

The fibers can be wet wound. A prepreg roving can also be used to form a matrix. The fibers can also be wound with and/or around, spun with and/or around, molded with and/or around, or hand laid with and/or around a metallic material or two or more metallic materials to create an epoxy impregnated metal or a metal impregnated epoxy.

A post cure process can be used to achieve greater strength of the material. A suitable post cure process can be a two stage cure having a gel period and a cross-linking period using an anhydride hardener, as is commonly known in the art. Heat can be added during the curing process to provide the appropriate reaction energy that drives the cross-linking of the matrix to completion. The composite may also be exposed to ultraviolet light or a high-intensity electron beam to provide the reaction energy to cure the composite material.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow.

The invention claimed is:

1. An insert for a plug, comprising:
a body;
one or more outer threads disposed on an outer surface of the body, the one or more outer threads adapted to engage one or more threads of the plug; and
one or more shearable threads disposed on an inner surface defining a bore of the body, the shearable threads adapted to engage one or more threads of a setting tool, hold the setting tool within the insert against a, first upward setting tool axial force on the shearable threads, and shear to release the setting tool from the bore of the insert responsive to a second upward setting tool axial force on the shearable threads, the second axial force being larger than the first upward axial force, and
the insert is comprised and configured so the second axial force shearing the shearable threads releases the setting tool from the insert without disengaging the insert from the plug.

2. The insert of claim 1, wherein the outer surface of the body comprises a larger diameter and a smaller diameter forming a shoulder therebetween, the shoulder adapted to anchor the body within the plug against upward axial forces.

3. The insert of claim 2, wherein the shoulder comprises a first end that is substantially flat and a second end that transitions to the smaller diameter.

4. The insert of claim 1, wherein the shearable threads and the body are comprised of a shearable material, namely brass, cast iron, or combination thereof, and the plug is a frac plug.

5. The insert of claim 1, wherein the second upward axial force is predetermined and less than a force that will break the body.

6. The insert of claim 1, wherein the threads disposed on the outer surface of the body are right-handed threads, and the shearable threads are left-handed threads or the threads disposed on the outer surface of the body are left-handed and the shearable threads are right-handed.

7. The insert of claim 1, wherein a number of the shearable threads is between about 4 and about 12.

8. The insert of claim 1, wherein a pitch of the shearable threads is between about 0.1 mm and about 5 mm.

9. The insert of claim 1, wherein the bore extends through the body.

10. An insert for a plug, comprising: a body having a bore formed therethrough; threads disposed on an outer surface of the body and adapted to threadably engage with an inner surface of the plug; one or more shearable threads disposed on an inner surface of the body and adapted to threadably engage with a setting tool; wherein the shearable threads are adapted to hold the setting tool against a first axial force and to break when subjected to a second greater axial force which is controlled and predetermined to release the setting tool, and wherein the second force is less than a force required to break the body; and wherein the second force releases the setting tool from the bore of the insert without disengaging the insert from the plug.

11. The insert of claim 10, wherein the outer surface of the body has an upper smaller diameter and a lower larger diameter forming an upward facing shoulder on the outer surface of the body, the shoulder capable of abutting against a corresponding downward facing shoulder of the plug.

12. The insert of claim 11, further comprising an impediment adapted to restrict fluid flow through the bore of the body.

13. The insert of claim 12, wherein the impediment is a ball.

14. The insert of claim 12, further comprising an adapter pin adapted to cage the impediment in the bore of the body.

15. A method for setting a plug in a well, comprising the steps of:
inserting a shearable insert into a bore of a plug, the shearable insert comprising:
a body comprising brass, cast iron, or a combination thereof;
one or more outer threads disposed on an outer surface of the body, the one or more outer threads adapted to couple with one or more threads of the plug;
one or more shearable threads disposed on a bore of an inner surface of the body, the shearable threads adapted to couple with one or more threads of a setting tool, hold the setting tool within the insert against a first setting tool upward force against the shearable threads large enough to set the plug but not large enough to shear the shearable threads and to shear and release the setting tool from the inner surface of the bore of the body, responsive to a second setting tool upward force so the insert stays engaged with the plug, when the insert is exposed to a controlled, predetermined axial force; and
threadably engaging the threads disposed on the outer surface of the body with the threads of the plug.

16. The method of claim 15, further comprising the step of threadably engaging the shearable threads with the threads of the setting tool.

17. The method of claim 16, further comprising the step of exposing the shearable threads to a setting axial force by the setting tool large enough to set the plug within a wellbore and less than the controlled, predetermined releasing axial force.

18. The method of claim 17, further comprising the step of anchoring the insert within the plug with a shoulder, wherein the shoulder comprises a first diameter portion on the outer surface of the body that transitions to a second diameter portion on the outer surface of the body, the shoulder adapted to anchor the insert against upward axial forces.

19. The method of claim 17, further comprising the step of exposing the shearable threads to the predetermined releasing axial force such that the shearable threads break and release the setting tool from the insert.

20. The method of claim 15, further comprising the step of inserting a ball into a bore formed through the body to restrict fluid flow therethrough.

21. The method of claim 20, further comprising the step of inserting an adapter pin into the body such that the ball is positioned between a shoulder of the body and the adapter pin.

22. A downhole tool for isolating one wellbore zone from another wellbore zone, comprising:
a mandrel having a bore, an upper end and a lower end, the bore capable of accepting a setting tool through the upper end into the bore; and
an insert at or near the lower end of mandrel;
wherein the insert is held to the mandrel by engagement with a component surrounding the insert, the component connected to the mandrel;
the insert having an inner bore and inner threads on the inner bore;
the insert inner threads adapted to engage threads of a setting tool, and to hold the setting tool within the insert when the setting tool pulls upward on the insert inner threads with a first, controlled setting tool upward axial force; and to release the setting tool from the inner bore of the insert when the setting tool pulls upward on the insert inner threads at a second, controlled setting tool upward axial force by shearing the insert inner threads;
wherein the insert remains engaged with the component; and
wherein the insert remains in the same position with respect to the mandrel following the release of the setting tool from the inner bore of the insert.

23. The tool of claim 22, wherein the outer surface of the insert has an upper smaller diameter and a lower larger diameter forming an upward facing shoulder on the outer surface of the insert, and the surrounding component has a downward facing shoulder, the upward facing shoulder of the insert abutting the downward facing shoulder of the component; the abutting shoulders anchoring the insert within the component against upward axial forces pulling on the insert.

24. The tool of claim 23, wherein the insert is comprised of a shearable material, namely brass or other metallic materials, and the second upward force is less than the upward force required to break the insert; and the tool is a frac plug.

25. The tool of claim 22, wherein the outer surface of the insert has outer threads, the inner surface of the component has inner threads, the outer threads of the insert, and the inner threads of the components engage, the engaged insert component threads anchoring the insert within the component against upward axial forces pulling on the insert.

26. The tool of claim 22, wherein the outer surface of the insert has an upper smaller diameter and a lower larger diameter forming an upward facing shoulder on the outer surface of the insert, and the surrounding component has a downward facing shoulder, the upward facing shoulder of the insert abutting the downward facing shoulder of the component, the abutting shoulders anchoring the insert within the component against upward axial forces pulling on the insert; and wherein the outer surface of the insert has outer threads, the inner surface of the component has inner threads, the outer threads of the insert, and inner threads of the component engage, the engaged insert and component threads anchoring the insert within the component against upward axial forces pulling on the insert.

27. A downhole tool for isolating one wellbore zone from another wellbore zone, comprising:
a load ring;

a mandrel having a bore, an upper end and a lower end, the bore capable of accepting a setting tool through the upper end into the bore; and an insert at or near the lower end of mandrel;

the insert held to the mandrel by engagement with a component surrounding the insert, the component connected to the mandrel;

the insert having an inner bore and inner threads on the inner bore; the insert inner threads adapted to engage threads of the setting tool, and to hold the setting tool within the insert when the setting tool pulls upward against the load ring on the insert inner threads with a first setting tool upward axial force; and to release the setting tool from the inner bore of the insert when the setting tool pulls upward on the insert inner threads at a second setting tool upward axial force by shearing the insert inner threads; and the second upward axial force being greater than the first axial force, and sufficient to shear the insert inner threads and less than the upward force required to deform the insert if the inner threads did not shear: and wherein the insert remains engaged with the component; and wherein the insert remains in the same position with respect to the mandrel following the release of the setting tool from the inner bore of the insert.

28. A frac plug, comprising:

a mandrel having a bore, and an upper end and a lower end, the bore capable of accepting a setting tool through the upper end into the bore; and capable of accepting an insert at or near the lower end of the bore; and the insert having outer threads on an outer surface of the insert and inner threads on an inner bore of the insert, the insert located within the mandrel at or near the lower end of the bore;

a component surrounding the insert and having inner threads:

the insert held to the mandrel by engagement of the outer threads of the insert with the inner threads of the component;

an inner bore of the insert capable of accepting a lower end of the setting tool and the inner threads of the insert being comprised of a shearable material;

wherein the outer surface of the insert has an upper smaller diameter and a lower larger diameter forming an upward facing shoulder on the outer surface of the insert, and the surrounding component has a corresponding downward facing shoulder, the upward facing shoulder of the insert abutting the downward facing shoulder of the component, the abutting shoulders anchoring the insert within the component against upward axial forces on the insert;

wherein the outer threads of the insert and the inner threads of the component engage to anchor the insert within the component;

the inner threads of the insert are adapted to engage threads of the lower end of the setting tool and hold the setting tool within the inner bore of the insert against a first setting tool upward axial force which is sufficient to set the frac plug; and the inner threads of the insert are adapted to release the setting tool from the inner bore of the insert when the setting tool pulls upward on the inner threads at a second setting tool upward axial force by shearing the inner threads of the insert; the second upward axial force being greater than the first axial force, sufficient to shear the inner threads of the insert, and less than the upward force required to deform the insert if the inner threads did not shear.

29. A downhole tool for engagement with and settable against a casing, the downhole tool comprising:

a mandrel having an inner bore;

a load ring located about the mandrel;

an insert with an internal bore and inner threads on at least part of the internal bore for threadable engagement with a setting tool;

at least one slip located about the mandrel for engaging the mandrel and the casing upon setting;

at least one cone located about the mandrel for engaging the mandrel and the slip; and a packing element located about the mandrel for engaging the mandrel and casing upon setting;

wherein the inner threads of the insert are configured to engage threads of the lower end of the setting tool and hold the setting tool within the inner bore of the insert against a first setting tool axial force which is sufficient to set the tool: and wherein the inner threads of the insert are configured to break to release the setting tool responsive to a second controlled, setting tool axial force greater than the first, controlled setting tool axial force to remove the setting tool from the internal bore of the insert.

30. The tool of claim 29, wherein the first axial force generates compression force on elements of the tool located about the mandrel between the insert and the load ring for setting the tool against a casing or the like.

31. The insert of claim 29, wherein the bore extends through the body.

32. An insert for a plug, comprising:

a body having a bore formed therethrough;

threads disposed on an outer surface of the body and adapted to threadably engage with an inner surface of the plug;

one or more shearable threads disposed on an inner surface of the body and adapted to threadably engage with a setting tool;

wherein the shearable threads are adapted to hold the setting tool against a first axial force and to break when subjected to a second greater axial force which is controlled and predetermined to release the setting tool, wherein the second force is less than a force required to break the body; and wherein the outer surface of the body has an upper smaller diameter and a lower larger diameter forming an upward facing shoulder on the outer surface of the body, the shoulder capable of abutting against a corresponding downward facing shoulder of the plug.

33. The insert of claim 32, further comprising an impediment adapted to restrict fluid flow through the bore of the body.

34. The insert of claim 33, wherein the impediment is a ball.

35. The insert of claim 33, further comprising an adapter pin adapted to cage the impediment in the bore of the body.

36. The insert of claim 33, wherein the plug is comprised of a metal or metal alloy which is fully degradable in an aqueous downhole fluid, the metal or metal alloy being selected from the group of magnesium, magnesium alloys, aluminum and aluminum alloys.

* * * * *